UNITED STATES PATENT OFFICE.

JOSEPH FREIHERR VON MERING, OF HALLE-ON-THE-SAALE, GERMANY.

PROCESS OF MAKING ETHERS OF PARAOXYPHENYLURETHANE.

SPECIFICATION forming part of Letters Patent No. 537,841, dated April 23, 1895.

Application filed February 11, 1893. Serial No. 461,955. (Specimens.) Patented in Germany November 12, 1892, No. 69,328, and in Belgium December 10, 1892, No. 102,519.

*To all whom it may concern:*

Be it known that I, JOSEPH FREIHERR VON MERING, a subject of the German Emperor, residing at Halle-on-the-Saale, Germany, have invented certain new and useful Improvements in and Relating to the Production of Acetyl or Propionyl Combinations of the Paraoxyphenylurethans or their Ethers, (for which I have obtained Letters Patent in Germany, dated November 12, 1892, No. 69,328, and in Belgium, dated December 10, 1892, No. 102,519;) and I do hereby declare the following to be a full, clear, and exact description of the invention.

My invention relates to the production of acidyl combinations of the paraoxyphenylurethans, and particularly to the acetyl and propionyl combinations of the said paraoxyphenylurethans, and it has for its object the production of antipyretic and analgetic bodies for use as medicinal agents, to which end the invention consists in the process of obtaining such bodies and in the product.

The acetyl or propionyl combinations of the paraoxyphenylurethans ($C_6H_4OHNHCOOR$) in which R represents any desired alcohol radicle, are expressed by the following stoicheiometric formula—$C_6H_4OH.COCH_3.COOR$, have strong antipyretic and analgetic properties, and, according to my invention are obtained by substituting a suitable acidyl group, as acetyl or propionyl, for the hydrogen atom directly combined with the nitrogen atom of the paraoxyphenylurethans. The latter bodies are obtained by the action of chlor carbonic acid alkylester upon para amidophenol, and for the purposes of combining the acetyl or propionyl therewith, they are treated with glacial acetic acid, or with acetic acid anhydrid or acetyl chlorid.

The ensuing reactions are shown by the following stoicheiometric formulæ:

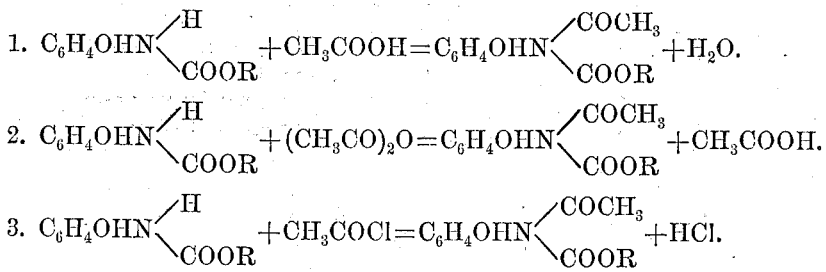

The following example clearly describes the process of effecting the acetyl combination.

*Production of paraoxyphenylacetylaethylurethan.*—I heat about ten kilos paraoxylphenylaethylurethan with a like proportion of acetic acid anhydrid, preferably under pressure for about one hour, after which the excess of acetic acid anhydrid is distilled off and the residue allowed to crystallize. In a similar manner other acetyl combinations of the paraoxyphenylurethans can be obtained by substituting the desired urethan in lieu of that above referred to, and, as heretofore stated the acetic acid anhydrid may be replaced by another acetylic agent. If, on the other hand, a propionylic agent is used in lieu of an acetylic agent, the corresponding propionyl combinations are obtained, and for this purpose propionic acid, or propionic acid anhydrid, or propionylchlorid may be employed, the mode of procedure and the proportions of ingredients being substantially the same as in the production of the acetyl combinations.

The products obtained by the process described are characteristic bodies that crystallize readily, are not easily soluble in cold water, but dissolve readily in alcohol as well as in glacial acetic acid, and possess marked antipyretic and analgetic properties, as it has been shown that a dose of 0.05 grams will reduce a fever temperature from 3° to 4° centigrade, in a comparatively short time, and said products constitute therefore appropriate and valuable medicinal agents, which may be administered internally in doses varying from one-half to one gram, either in the form of powders or pills, or in the form of a solution.

By the described process the following combinations can be obtained:

First. Paraoxyphenylacetylmethylurethan:

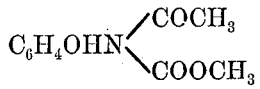

Foliated, color white, difficultly soluble in cold water, melting point about 118° centigrade.

Second. Paraoxyphenylacetylaethylurethan:

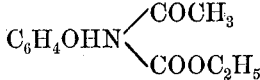

Crystallizes out of alcohol in colorless prisms or needles, melting point about 87° centigrade.

Third. Paraoxyphenylacetylpropylurethan:

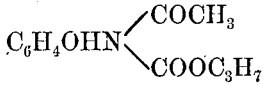

Foliated, color, white, melting point about 85° centigrade.

Fourth. Paraoxyphenylacetylisobutylurethan:

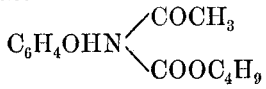

In the form of small white felted needles, melting point about 91° centigrade, readily soluble in alcohol.

Fifth. Paraoxyphenylacetylisoamylurethan:

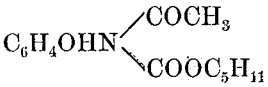

Separates out of glacial acetic acid on addition of water in the form of small more or less felted needles, melting point about 63° centigrade.

Sixth. Paraoxyphenylpropionylmethylurethan:

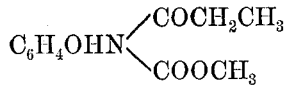

Is of foliated form; melting point about 86° centigrade.

Seventh. Paraoxyphenylpropionylpropylurethan:

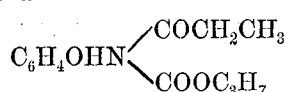

Separates out of glacial acetic acid on addition of water in a foliated form, melting point about 80° centigrade.

Having thus described my invention, what I claim as new therein, and desire to secure by Letters Patent, is—

1. The process, which consists in heating para-oxyphenylurethan with an acidyl reagent, for the purpose set forth.

2. The process, which consists in substituting a suitable acidyl group for the hydrogen atom directly combined with the nitrogen atom of para-oxyphenylurethan, as by heating the aforesaid urethan with an acidyl reagent, for the purpose set forth.

3. As new chemical products, acidyl combinations of the paraoxyphenylurethans, said products crystallizing readily, being almost insoluble in cold water, readily soluble in alcohol and glacial acetic acid, and having antipyretic and analgetic properties.

JOSEPH FREIHERR VON MERING.

Witnesses:
CARL BORNGRAEBER,
HERMANN PFABE.